Figures 1, 2, 3:
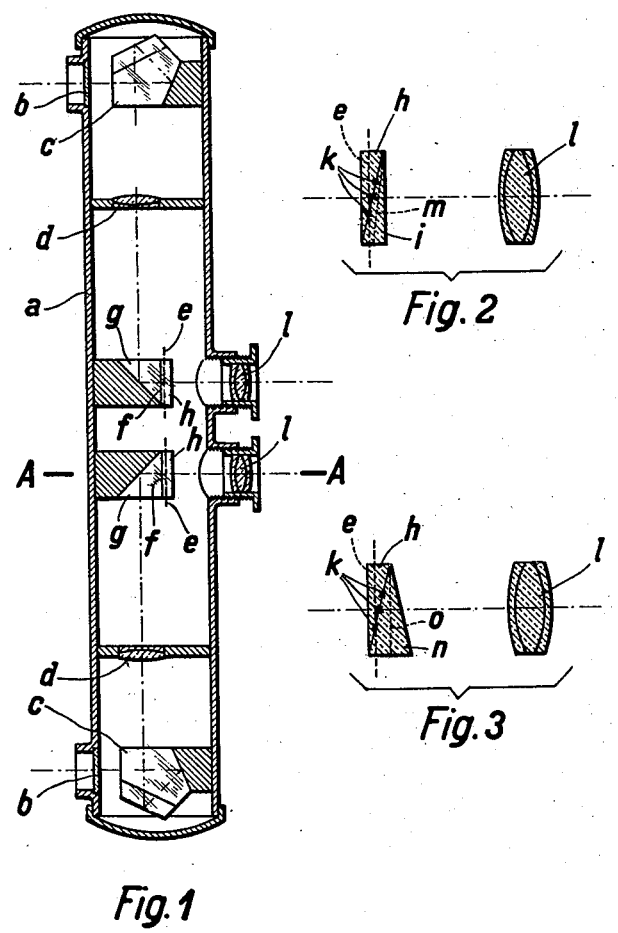

Jan. 25, 1938.                O. EPPENSTEIN                2,106,631
           STEREOSCOPIC RANGE FINDER HAVING STATIONARY MEASURING MARKS
                            Filed Sept. 30, 1936

Inventor:

Otto Eppenstein

Patented Jan. 25, 1938

2,106,631

UNITED STATES PATENT OFFICE 2,106,631

STEREOSCOPIC RANGE FINDER HAVING STATIONARY MEASURING MARKS

Otto Eppenstein, Jena, Germany, assignor, by mesne assignments, to Bausch & Lomb Optical Company, Rochester, N. Y., a corporation of New York Application September 30, 1936, Serial No. 103,307 In Germany October 5, 1935

3 Claims. (Cl. 88—2.6)

I have filed an application in Germany, October 5, 1935 of which the following is a specification.

The invention refers to a steroscopic rangefinder having in its fields of view stationary marks that are to be so united in pairs stereoscopically as to constitute a number of stereoscopic measuring marks at different apparent distances, measurements being effected by a comparison of the distance of the viewed object and the apparent distances of the stereoscopic marks. In the known rangefinders of this kind, the single marks lie in the focal planes of the objectives. The fact, however, that the images produced by the objectives lie in the focal planes only when objects at infinity are concerned, and that near objects are imaged in the rear of the said planes, very often entails a disturbing parallax between the object images and the stereoscopic measuring marks, which parallax may considerably falsify measurements especially when objects at comparatively small distances are concerned.

The invention aims at overcoming this disadvantage by providing the measuring marks in those planes in the rangefinder in which the objectives image objects that are at such distances as correspond to the respective steroscopic marks, measuring errors due to parallax being reduced to innocuousness by merely approximating the said condition. Each measuring mark may be disposed on a plano-parallel glass plate of corresponding thickness, and the glass plates of each field of view may be combined to a set of glass plates constituting a mark carrier. It is, however, especially advantageous to arrange the measuring marks of each of the two fields of view in one plane inclined relatively to the focal plane of the corresponding objective. Accordingly, there may be used, for example, a mark plate disposed in and inclined relatively to the ray path. The said condition is easily arrived at by suitably distributing the measuring marks on this inclined plane. The same purpose is served, however, also by disposing the measuring marks on a curved surface of the mark carrier.

An especially simple construction is obtained by using as carriers for the measuring marks plano-parallel plates which consist of two glass wedges traversed by the imaging rays subsequently to each other and having the marks on their cemented surfaces. Owing to the refraction of the rays by the glass wedges traversed last, an observer looking into the eye-pieces perceives the marks as lying in planes which are less inclined to the focal planes of the objectives than the cemented surfaces. If, as is the case generally, the eye-pieces are so arranged that their focal planes coincide with those of the objectives, and when measuring marks at different apparent distances are used, the different distances which obtain between the eye-pieces and the marks and are due to the inclination of the planes containing the marks make it necessary to vary the axial adjustments of the eye-pieces as soon as the capacity of adaptation of the observer's eyes fails to neutralize these differences. Axial adjustments of the eye-pieces can, however, be dispensed with in the measurement of objects at different distances when the mark carriers are wedge-shaped plates each of which consists of two glass wedges traversed subsequently to each other by the imaging rays and whose cemented surfaces carry the marks, and when the wedges traversed last have such refracting angles that the cemented surfaces appear to lie in planes parallel to the focal planes of the objectives and the eye-pieces. In case the last said condition is fulfilled only approximately, the adaptation of the observer's eyes will be sufficient, as a rule, and not need the help of axial adjustments of the eye-pieces. The wedge-shaped mark carriers, however, deviate the pencil of rays in such a manner that the image plane does not appear to be at right angles to the axes of the pencils of imaging rays. How these reciprocal positions are reinstated has been treated repeatedly in the literature of the art and is therefore considered as known.

In the accompanying drawing, which illustrates a constructional example of a stereoscopic rangefinder according to the invention, Figure 1 shows the rangefinder in plan view section and Figures 2 and 3 represent different forms of single optical parts in sections through line A—A in Figure 1.

The rangefinder has a housing $a$. In this housing are provided two windows $b$ whose distance apart corresponds to the base length and behind which pentagonal prisms $c$ are disposed whose reflecting surfaces are in the shape of roofs. These prisms $c$ deflect at right angles the pencils of imaging rays entering the windows $b$ and direct them to objectives $d$ which combine all incident pencils of parallel imaging rays in planes $e$ at a small distance behind the ray exit surfaces $f$ of triangular prisms $g$. Plano-parallel plates are cemented to the ray exit surfaces $f$ in the manner shown by Figure 2, each of these plates consisting of two wedge-shaped glass prisms *h* and *i* and having measuring marks *k* on their inclined cemented surfaces. The measuring marks *k* are viewed by means of adjustable eye-pieces *l*.

The known stereoscopic combination of the marks *k* in pairs provides stereoscopic measuring marks at definite apparent distances. The marks *k* are so disposed on the inclined cemented surfaces of the plates that the planes of the marks, which are parallel to the focal planes *e* of the objectives, correspond to the planes in which the objectives *d* image the objects lying at corresponding distances. On account of the refraction due to the wedges *i*, an observer looking into the eye-pieces *l* perceives the cemented surfaces as lying in the surface *m* indicated in the drawing by dotted lines. Also this surface *m* is inclined to the focal planes of the objectives *d* and the eye-pieces *l*. Accordingly, when the different marks *k* are looked at, the eye-pieces *l* require to be adjusted axially if these differences in the positions of the marks *k* cannot be neutralized by the capacity of adaptation of the observer's eyes.

The said disadvantage can be avoided by using plates according to Figure 3, which are in the form of wedges, and each of which consists of two glass wedges having inclined cemented surfaces. The one glass wedge of each plate corresponds to the wedges *h* of the example illustrated by Figure 2. The other glass wedge of each plate, which is designated *n*, has a refracting angle greater than that of the wedges *i* according to Figure 2 and is so constructed that the inclined cemented surfaces appear to lie in planes *o* parallel to the focal planes of the objectives and the eye-pieces.

I claim:

1. A stereoscopic rangefinder having a housing, this housing being provided with two stationary objectives and two eye-pieces displaceable in the directions of their optical axes, two reflecting systems for displacing the pencils of imaging rays of the said objectives parallel to themselves, stationary measuring marks disposed in the said housing and lying in planes containing those of the images produced by the said objectives which correspond to objects whose distances from the rangefinder correspond to the apparent distances of stereoscopic marks due to combination in pairs of the said measuring marks, these measuring marks lying in two planes inclined to the focal planes of the two objectives, respectively, and two mark carriers disposed in the said housing, one of the surfaces of each mark carrier coinciding respectively with these last said planes.

2. In a stereoscopic rangefinder according to claim 1, each of the said carriers consisting of plano-parallel plates fixed into the said housing, each of these plates consisting of two wedge-shaped parts cemented together, and the said measuring marks being disposed on the cemented surfaces of the said parts.

3. In a stereoscopic rangefinder according to claim 1, each of the said carriers consisting of wedge-shaped plates fixed into the said housing, each of these plates consisting of two wedge-shaped parts cemented together, and the measuring marks being disposed on the cemented surfaces of the said parts.

OTTO EPPENSTEIN.